United States Patent [19]

Fuchs et al.

[11] Patent Number: 5,257,965
[45] Date of Patent: Nov. 2, 1993

[54] ROLLER FOR PRESSURE TREATMENT OF WEBS

[75] Inventors: Karl-Dieter Fuchs, Ebersbach/Fils; Wolfram Friesen, Nettetal-Lobberich, both of Fed. Rep. of Germany

[73] Assignee: Cerasiv GmbH Innovatives Keramik-Engineering, Polochingen, Fed. Rep. of Germany

[21] Appl. No.: 773,596
[22] PCT Filed: May 9, 1990
[86] PCT No.: PCT/EP90/00745
  § 371 Date: Nov. 18, 1991
  § 102(e) Date: Nov. 18, 1991
[87] PCT Pub. No.: WO90/13706
  PCT Pub. Date: Nov. 15, 1990

[30] Foreign Application Priority Data

May 12, 1989 [DE] Fed. Rep. of Germany ....... 3915508

[51] Int. Cl.$^5$ .................... B21B 27/00; B21B 13/02
[52] U.S. Cl. .......................... 492/6; 492/40; 492/42; 492/47; 492/56
[58] Field of Search ........... 29/113.1, 113.2, 116.1, 29/116.2, 117, 123, 124, 125, 126, 132; 492/4, 5, 6, 7, 21, 38, 39, 40, 42, 47, 53, 56

[56] References Cited

U.S. PATENT DOCUMENTS

| | | | |
|---|---|---|---|
| 696,416 | 4/1902 | Denégre. | |
| 936,250 | 10/1909 | McDonough | 29/125 |
| 993,387 | 5/1911 | Lucke | 29/125 X |
| 1,210,401 | 1/1917 | Bergstrom | 29/125 X |
| 1,586,100 | 5/1926 | Meyer | 29/125 X |
| 1,612,990 | 1/1927 | Silverstein et al. | 29/125 X |
| 2,446,211 | 8/1948 | Clark | 29/125 X |
| 2,661,665 | 12/1953 | Knoll | 29/125 X |
| 4,058,877 | 11/1977 | Lehmann | 29/116.2 |
| 4,691,420 | 9/1987 | Schiel et al. | |
| 4,839,949 | 6/1989 | Sobue et al. | 29/132 |

FOREIGN PATENT DOCUMENTS

| | | |
|---|---|---|
| 0053804 | 6/1982 | European Pat. Off.. |
| 0207921 | 1/1987 | European Pat. Off.. |
| 2707657 | 8/1978 | Fed. Rep. of Germany. |
| 3546343 | 7/1986 | Fed. Rep. of Germany. |
| 3617316 | 11/1986 | Fed. Rep. of Germany. |
| 3528588 | 2/1987 | Fed. Rep. of Germany. |

Primary Examiner—Timothy V. Eley
Attorney, Agent, or Firm—Felfe & Lynch

[57] ABSTRACT

A roller for the pressure treatment of webs, especially a roller such as a press or calender roller for the treatment of paper, cardboard and pulp webs in machines of the paper industry, which include a roller shell, roller flange and a roller shaft, one or more elastic, axial or coaxial clamps and elastic or yielding centering structures. The roller shell includes individual rings of sintered ceramic disposed side by side, the rings are clamped positively together by the one or more elastic, axial or coaxial clamps and the rings are aligned concentrically on the roller shaft by means of the elastic or yielding centering structures.

21 Claims, 4 Drawing Sheets

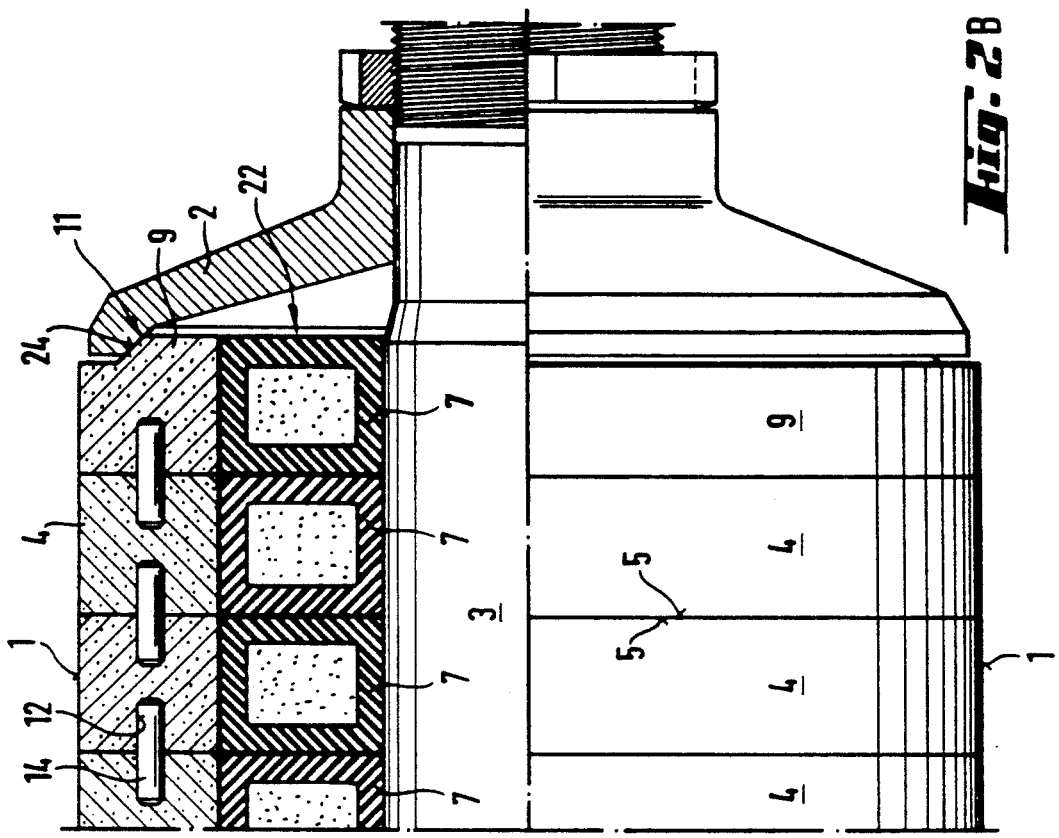
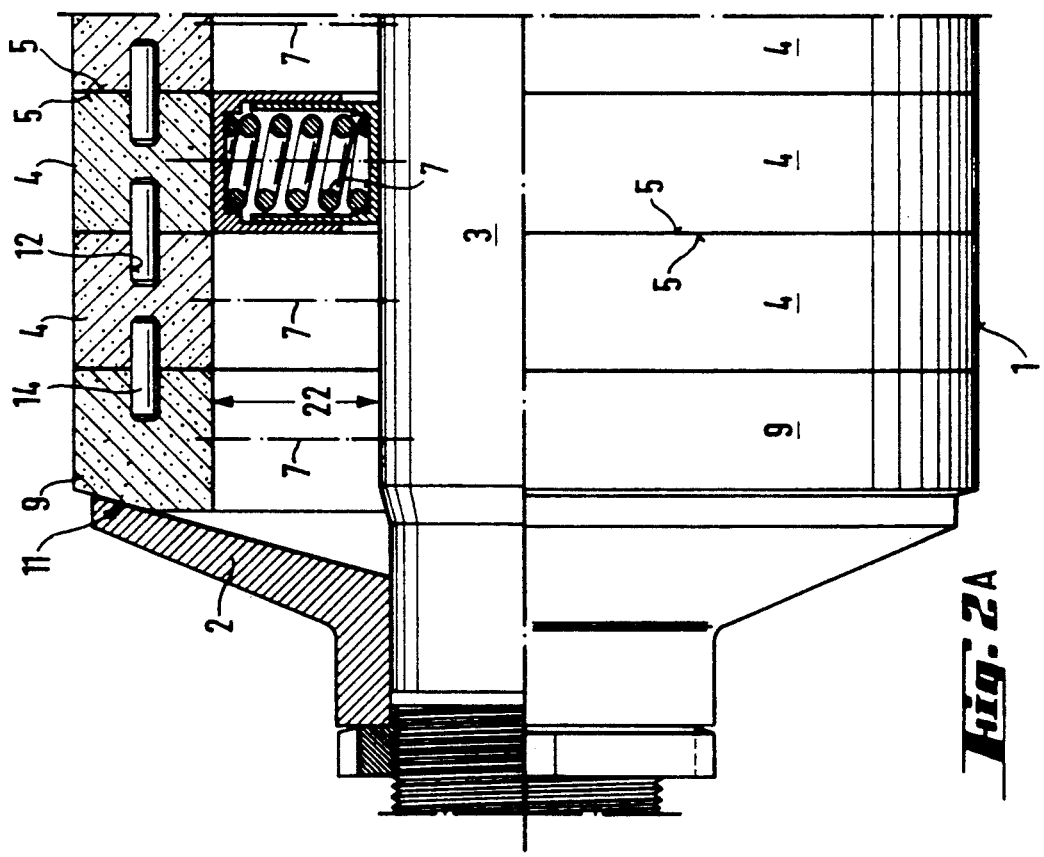

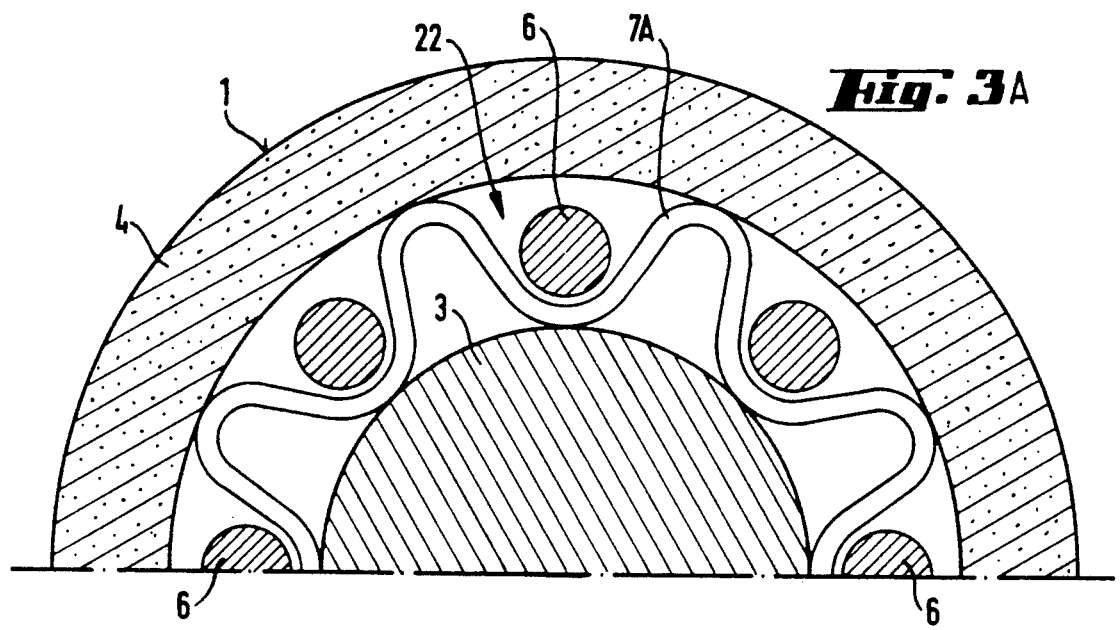
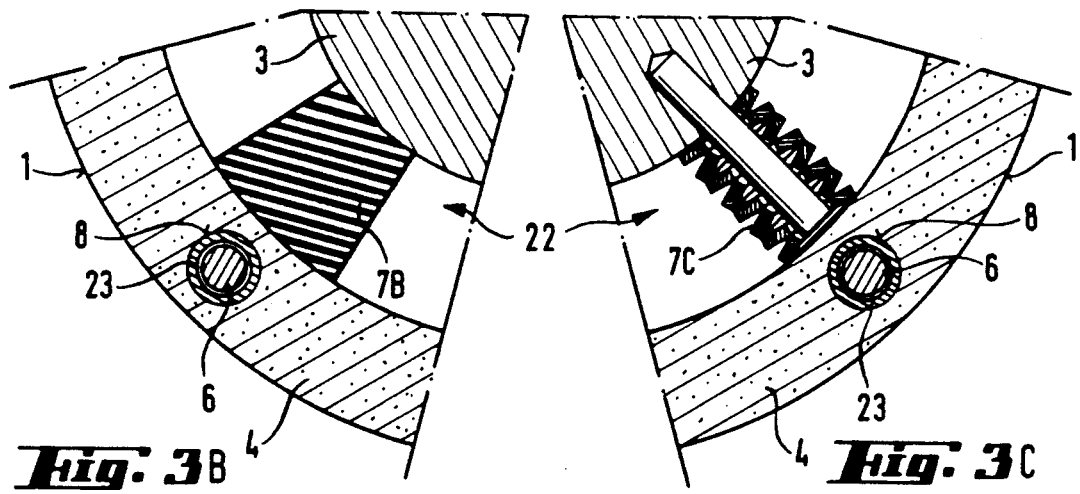

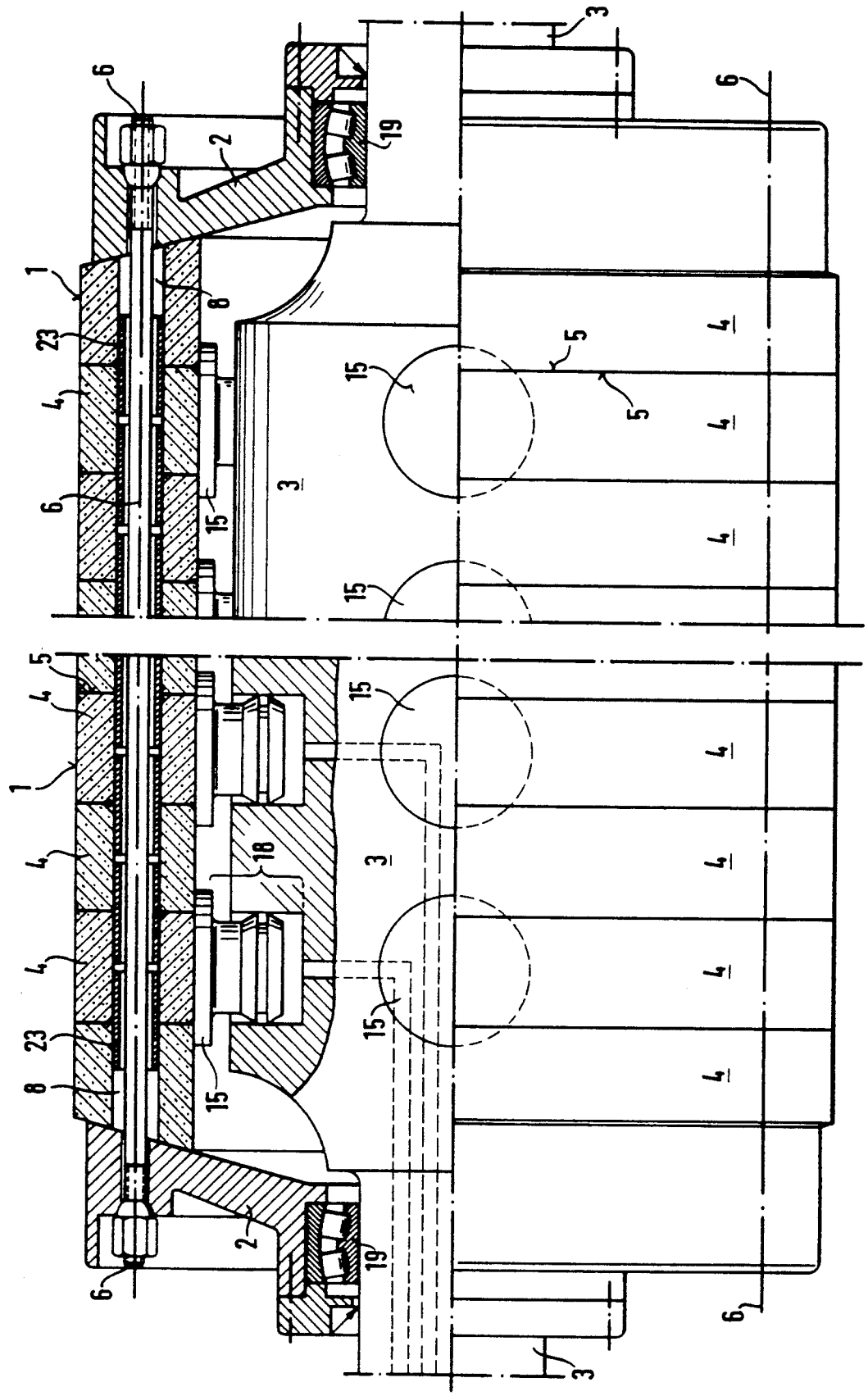

ROLLER FOR PRESSURE TREATMENT OF WEBS

BACKGROUND OF THE INVENTION

The invention relates to a roller according to the introductory part of claim 1. Rollers of this kind have a diameter of 0.3 to 1.50 meters and a length of up to 9 meters; the shell of the roller in the case of press rollers consists usually of granite, and, in the case of hard calender rollers, it consists of special cast iron with a sometimes chromium plated surface. As it is known, granite is an igneous rock which has a granular, speckled appearance, and consists usually of tightly packed crystals of quartz, feldspar, mica and a number of smaller components such as magnesite and iron pyrites which can be seen only with a microscope. The following material characteristics are found in the literature on granite:

| Important Material Characteristics: | |
| --- | --- |
| Tensile strength | 10–20 N/mm$^2$ |
| Compressive strength | 160–240 N/mm$^2$ |
| Compressive fatigue limit | approx. 110 N/mm$^2$ |
| Modulus of elasticity | 15,000–71,000 N/mm$^2$ |
| Poisson's number | 0.2 |
| Density | 2.62–2.85 g/m$^2$ |
| Specific heat capacity | 710–840 J/kgK |
| Thermal conductivity | 2.9–7.5 W/mK |
| Thermal change of length | 5–9 m/mK |

In recent times it has emerged that the most critical of these material characteristics is the tensile strength, which is very low in all rock. Also, the tensile strength test is very complicated, since the shape, size and loading method have a great influence on the results and also, when considering its properties, it must be taken into consideration that granite, as a natural product, varies greatly, and local flaws in the structure can never be ruled out. With increasing size of the roller diameter and increasing speed of paper machines, the centrifugal force involved approaches the limit, and the first destructions of granite rollers have already been published, which not only resulted in severe disturbances of production but also constituted great danger to personnel in the vicinity of the machine.

To avoid the known disadvantages it has already been proposed to use press rolls whose outer periphery consists of plastic admixed with pulverized rock as filler—EP Patent 53 804.

It is likewise known to form the shell of the roller form a mixture of metal powder and a powder of inorganic substances, using as metals steel, nickel, chromium, titanium, copper or bronze, and, as the inorganic substances, quartz, feldspar, aluminum oxide, zirconium oxide, titanium oxide, titanium carbide, silicon carbide, magnesium oxide, silicon nitride, chromium oxide, tungsten carbide, niobium carbide, vanadium carbide, chromium carbide, or mixtures thereof—German Patent Disclosure Document 35 46 343.

It has furthermore been proposed to build up the shell of the press roller in the form of a hardened body of a hydraulic composition, i.e., from cements and mineral materials, and to cure it so that a compressive strength is achieved of not less than 1,000 kp/cm$^2$ and a density of not less than 2.5. Portland cements, oil cements, silica cements and fly ash cements as well as blast-furnace cements have been proposed as the cements, and, as mineral materials, alite ($CA_3SiO_5$), blast furnace slag, fly ash, and particles of crushed rock, such as granite, quartz, and feldspar, and additives, activators etc. are added in addition to water—German Patent Disclosure Document 36 17 316.

It is furthermore known to apply a coating to a shell of the roller made of metal, the coating consisting of chromium or stainless steel to which one or more components of a ceramic substance have been added. $Al_2O_3$, $SiO_2$, $TiO_2$, $ZrO_2$, SiC, TiC, $Cr_3C_2$, WC, NbC, VC, and $Cr_7C_3$ have been proposed as ceramic additive materials.

An additional proposal for the production of a press roll is contained in European Patent Disclosure Document 207,921. According to this proposal, first a metal intermediate layer of a lower coefficient of expansion than that of the roller body is applied to a metal roller, and onto that a porous ceramic is applied, both of the processes of application being based on plasma coating or flame spraying. The metal intermediate layer is applied so as to achieve the lowest possible difference between the coefficients of expansion of ceramic and metal.

In practice, however, all of these proposals have disadvantages which permit the use of such rollers not at all or to only a limited extent. For example, placing a metallic intermediate layer between ceramic coating and the supporting body does slightly reduce the effect of thermal expansion, but in the case of diameters of 1.50 m and over, and roller lengths of over 8 m, as are common in modern paper machines, the differences in expansion have been such that the bond between ceramic and metal is broken, leading to the destruction of the roller. With regard to common roller diameters, common lengths and temperature differences of up to 50 degrees, the result is the following when the machine is started up: with respect to the diameter, the metal core expands more than 600μ more than the ceramic shell, and with respect to the length the difference in expansion is about 3,500μ.

Similar difficulties are encountered if a coating is applied which consists of plastics, and in some case also of metals and ceramic powders mixed therewith. In these cases, the complete coating does not come off as a layer, but the bond between the inorganic powder and the support layer does break down, resulting in increased wear.

The so-called synthetic stone rollers, which are virtually rollers of concrete, come closest to the granite natural product, but they also have their disadvantages, i.e., the surface is not uniform as regards grain distribution and granular composition, since here again natural products are used. The tensile strength, which is decidedly low though the compressive strength is very good, is just as critical as in the case of granite. The danger that a synthetic stone might fly apart at high speeds and large diameters, such as has occurred in the meantime in granite rock, is thus not eliminated.

Calender rollers of special cast iron present no difficulties as regards optimum strength, but in the use of these rollers the critical point is the surface of the roller, as regards hardness and average roughness $R_a$, especially when papers containing abrasive fillers or paint pigments are to be calendered.

The problem to which the present invention is addressed is thus to retain the good surface properties which granite rock has in wet press rolling—namely, good release of paper from the roller, good wettability with water, less wear from scrapers—and nevertheless largely to eliminate the disadvantages of the natural product, especially to increase tensile strength, permit a uniform, repeatable surface structure, and become independent of granite quarries.

Another problem is to make calender rollers available with an improved surface for glazing paper.

In a roller of this general kind, this problem is solved by the specific part of claim 1 and the claims subordinate thereto.

SUMMARY OF THE INVENTION

The use of sintered ceramic as a material for a roller for pressure treatment provides several advantages over the prior art.
1. Starting materials are available in any desired amounts, so the starting material is easy and convenient to obtain.
2. It is not necessary to transport and work gigantic blocks from which to produce a shell of the roller by laborious mechanical processes.
3. The required surface of the shell of the roller is reproducible at any time.
4. The strength of the shell of the roller is equal in all areas.
5. The chemical composition of the roller shell can be adapted to requirements. For what it is, is not a conglomerate of starting materials that just happen to be there, as in the case of the natural product. Instead, by careful selection and by controlling the conditions of manufacture, an optimum can be achieved in regard to grain size and chemical structure as well as surface properties.

By dividing the roller into individual rings not only is rational manufacture possible, but it is also possible by varying the number of rings to produce rollers in different lengths without the need to modify the shape of the individual rings.

In the stone rollers used heretofore, i.e., granite roller shells, and also in hard calender rollers, some areas of the roller shell could become damaged, so that flaws in the paper occurred in these areas with the result that the entire roller had to be reground or even replaced. With the roller configuration now available it is possible to replace portions of the roller while continuing to use the undamaged areas, i.e., it is possible to replace one or more rings, resulting in an appreciable cost reduction.

Feature b) of claim 1 serves for the axial bias that couples the individual rings, the bias being selected such that gaps between the individual abutments between the rings is prevented even when the roller shaft expands in the axial direction due to its warming up to its operating temperature.

Ceramic, of course, cannot be stressed in tension. Since in the case of press rollers line pressures up to 120 kN/m are involved, and even up to 300 kN/m in calender rollers, the roller shell formed from the individual rings is flexurally stressed by the line load. In accordance with the invention, therefore, means are provided between the roller shaft and the rings, which on the one hand center the rings coaxial with the roller shaft, and on the other hand are in turn under bias such that the line load applied to the roller shell can be transferred reliably to the roller shaft. The ceramic roller shell thus is subjected only to compressive stress at its linear contact with one or more counter-rollers, for which ceramic is, of course, outstandingly suited.

The surface of the roller shell formed by the individual rings is subjected to stress both by the paper web being treated and by cleaning devices, such as scraper blades, engaged with it. In the case of press rollers, the surface is to be as smooth as possible so as to offer no point of attack to the cleaning scraper for premature wear, such as occurs especially when monel-metal scrapers are used. This problem is solved by the distinctive features of claim 2.

To achieve an optimum axial coupling of the individual rings it is proposed in preferred embodiments of the invention that the average roughness $R_a$ of the end faces of the rings be equal to or less than 0.5 $\mu$m, and that they have a flatness of less than 2 interference fringes, and that the parallelism of the face be less than a deviation of 0.01 $\mu$m per 1000 $\mu$m of measured length. The first two features assure that no gaps will form between the individual rings when they are assembled to form the roller shell, i.e., that no marks will be formed on the paper web that might result in rejection. The feature of the parallelism of the end faces assures that, even in the case of great roller lengths the shell of the roller will have the shape of a straight or barreled cylinder, i.e., that the grinding work required in manufacturing the roller shell will be substantially reduced.

According to an advantageous embodiment of the invention, the rings are joined together by at least one elastic tie rod, the tie being formed by the roller shaft itself.

It is necessary that considerable compressive forces be transmitted to the rings by the flanges of the roller when the roller is at room temperature. This is to be attributed to the fact that sintered ceramic has a considerably lower thermal expansion coefficient than does the material of the roller shaft; in other words, as it heats up to working temperature the roller shaft elongates substantially more than do the rings.

If the roller shaft is not to be subjected to tensile stress, then, in accordance with another advantageous embodiment, the axial tensioning means can be constituted by a plurality, but at least three, of tie rods disposed on a circle concentric with the roller axis. These are coupled with the flanges of the roller and biased so that the roller shell formed from the individual rings will be held together securely even when the overall roller structure becomes heated. The tie rods can be disposed in the annular space between the roller shell and the roller shaft, so that, in the case of rings of sintered ceramic, no special measures are needed for the accommodation of the tie rods. It is evident to the man of the art that, in this kind of construction, the flanges of the roller have to be of appropriate size and at least one of them must be freely displaceable on the roller axis.

According to an additional, preferred embodiment of the invention, the roller flanges are in the form of plate springs which, in conjunction with the less elastic roller shaft, transmit the axial pressure forces by means of bias to the rings forming the roller shell. The plate springs in that case must be positively joined to the roller shaft by conventional methods of attachment, e.g., a central screw thread in the bores of the plate springs or set screws.

The elastic, yielding centering means for compensation of unilateral line loads can be formed by at least three radially disposed metal springs. Any common type of spring can be used, such as spiral springs, leaf springs, doubled plate springs, or ring springs, especially corrugated and divided rings to compensate thermal expansion in the radial direction.

Since steel springs are sensitive to corrosion, but the interior of the roller cannot be kept absolutely moisturefree, the resilient centering means can also consist of rubber-elastic materials, such as hard rubber, for example. These are disposed radially either as individual blocks, or a whole ring of this material can be provided in the space between the roller shell and the roller shaft, and is preferably made oversize so as to exert a bias after insertion into the annular space. It has been found desirable to vulcanize the rubber-elastic blocks or rings to the ceramic rings. The rubber-elastic rings can even be made tubular and filled with a compressible medium.

For the fixation of the metal springs in their radial position, devices such as pins, recesses or the like can be provided both on the central roller and on the inside surface to hold the springs against the surfaces thrusting against them. It is also possible, however, to fasten the elastic centering means to the axial tie rods disposed concentrically within the annular space between the roller shell and the roller shaft.

Another embodiment of the elastic, yielding centering means provides that the latter be formed by pneumatically or hydraulically actuated supporting elements which extend radially between the roller shell and shaft, and are connected to a pressure accumulating equalization system. Such systems are generally known in flexural adjusting rollers, so-called "S-rollers," an example being German published patent application 27 07 657, for example.

A further, advantageous embodiment of the invention provides that the rings have in their end faces at least three bores distributed around their circumference. These bores serve to accommodate tie rods and thus to clamp the rings against one another. The tie rods can be of a design similar to conventional expansion bolts; when setting the tension during assembly, it must be assured that the total expansion of the expansion bolts when hot will not endanger the integrity of the rings.

Additional advantageous embodiments of the invention provide that the two outside rings in the outer parts of the roller shell bear projections on their outer faces, these projections being preferably conical in shape. The flanges of the roller engage these projections. On account of differences in thermal expansion it is not possible to perform a direct internal centering of the rollers, i.e., to fasten the shell at its inside diameter onto the outside diameter of the roller shaft, since such a design would burst the shell. The invention therefore provides for an external centering, i.e., the roller flanges overlap the projections provided on the outer faces of the outer rings. Since these projections are held conically and accordingly the roller flange is also given a hollow conical shape, the result is a slipping movement upon warming, between the roller flange and the conical surface of the projection, thereby achieving always a secure form-lock between the roller flange and the outer face of the shell.

In cases where the rings have only a relatively small wall thickness the invention provides that the outer faces of the outer rings as such are configured truncoconically, thereby achieving the advantages of external centering even in the case of small wall thicknesses.

A preferred embodiment of the invention provides that the rings have bores in their end faces to accommodate anchor bolts or expansion sleeves in accordance with DIN 7346. This embodiment results in a great advantage as regards machining, since in comparison with other designs no full-surface grinding of the rings is necessary, i.e., the inside surface of the ring does not have to be machined. The bores themselves can be either through-bores or blind holes, and are distributed uniformly over the circumference of the rings. The bores permit a rapid assembly of the rings to form the shell of the roller.

If the bores are through-bores, the tension rod can be passed through the expansion sleeves with clearance. Additional bores to accommodate the anchor bolts are then unnecessary.

Conventional engineering ceramic of oxidic or nonoxidic materials has proven valuable as ceramic material for the sintered rings, provided they have a sufficiently high density and hence low porosity, sufficient Vickers hardness, compressive strength, flexural strength and resistance to acid and alkaline media.

Such suitable ceramics are described, for example, in:

| | | |
|---|---|---|
| a) | Oxidic ceramics | |
| | $Al_2O_3$ | DE-A-29 09 291 |
| | $ZrO_2$ | DE-A-23 07 666 |
| | $ZrO_2$-toughened $Al_2O_3$ | DE-A-27 44 700 |
| | $ZrO_2$-toughened $Al_2O_3$ | DE-A-30 22-213 |
| b) | Nonoxidic ceramics | |
| | Silicon carbide | DE-A-26 24 641 |
| | Silicon carbide | DE-A-37 33 730 |
| | Silicon nitride | DE-A-30 29 831 |
| | Sialon | DE-A-23 00 547. | to which reference is here expressly made.

BRIEF DESCRIPTION OF THE DRAWINGS

FIG. 1 shows on the right, FIG. 1B, a longitudinal cross section of part of the roller according to the invention;

FIGS. 2, A and B, is a longitudinal view, partially in cross section, of a roller with roller flanges configured as plate springs;

FIGS. 3, A, B, and C show a cross section through the cylinder according to the invention;

FIG. 4 is a longitudinal view, partially in cross section, of another embodiment of a roller according to the invention.

Figure 1A:
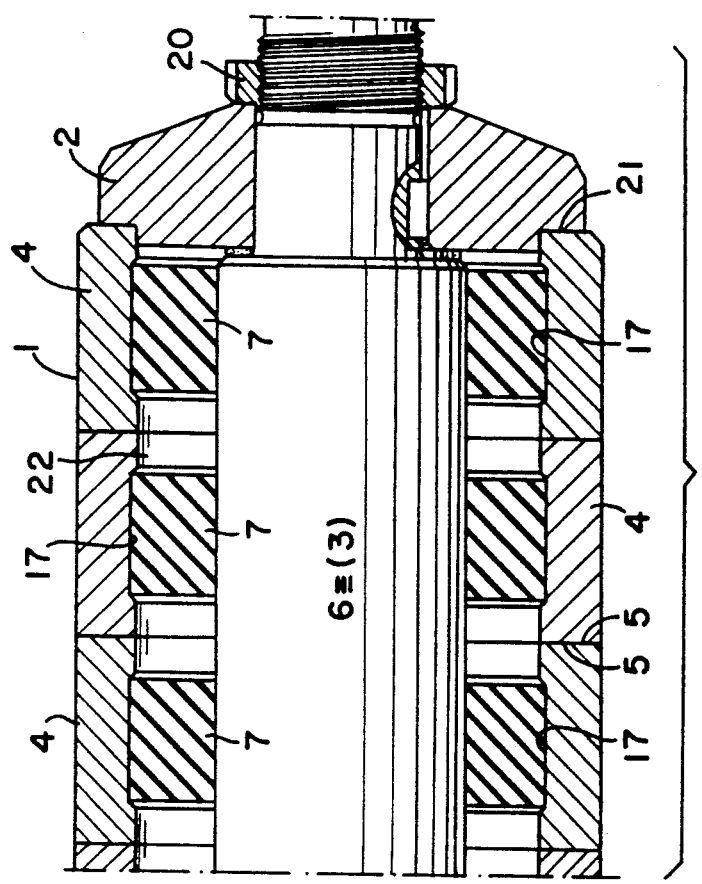
FIG. 1 shows on the left, FIG. 1A, a longitudinal cross section of part of a roller according to the invention.

The invention will be further explained with the aid of the drawings, the subject matter of the invention not being limited to the embodiments represented in the drawings.

DESCRIPTION OF THE PREFERRED EMBODIMENTS

FIG. 1 shows on the left, FIG. 1A, a longitudinal cross section of part of a roller according to the invention. The roller shell (1) is formed by the individual ceramic rings (4) whose end faces (5) are in contact with one another and held together by means of the two flanges (2) which are locked to the roller shaft (3). Between the roller shaft (3) and the rings (4) are the elastic centering means (7).

Figure 1B:
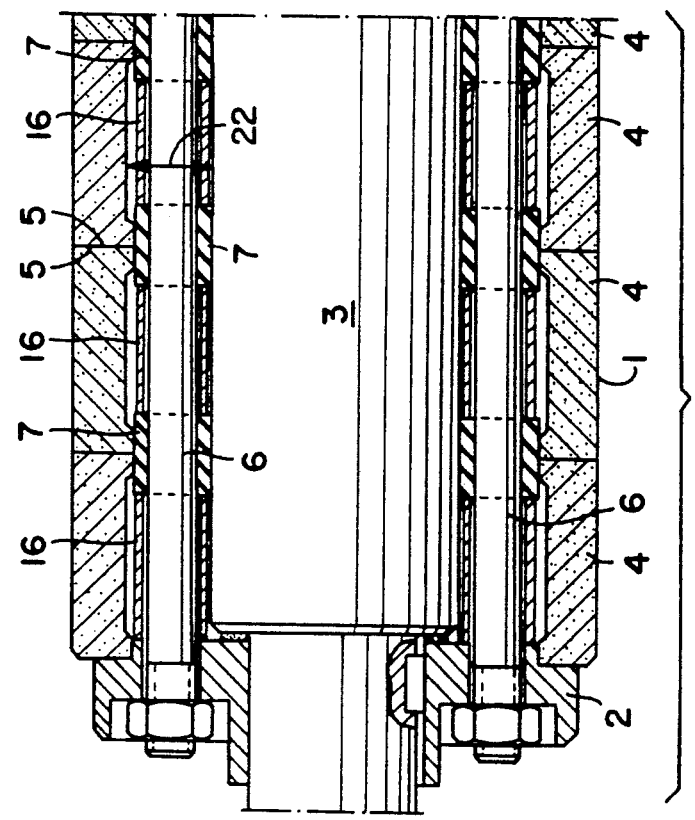

On the right side of FIG. 1, FIG. 1B, the roller shaft (3) is simultaneously a tie rod (6). To apply the necessary tension, the roller flange (2) can be forced by means of a notched nut (20) against the end (21) of the roller in a conventional manner. Between each ring (4) and the roller shaft (3) are the elastic centering means (7) which engage in recesses (17) in the form of circumferential grooves in the inner surface of the ring (4).

In the left part of FIG. 1, FIG. 1A, the roller shaft (3) is relieved of tension. The clamping together of the roller shell (1) is produced by the tie rods (6) disposed axially and, as a set, concentrically. These are anchored in the roller flanges (2) and disposed in the annular space (22) between the roller shaft (3) and the roller shell (1). The tie rods (6) bear the centering means (7) in the form of elastic bushings or annular springs. The centering means themselves span the abutment between two end faces (5) of the rings (4) and transfer the line force acting on the roller shell (1) to the roller shaft (3). Spacer rings (16) can be provided between the centering means to keep them in place.

FIGS. 2, A and B, shows the construction of a roller with the roller flanges (2) configured as plate springs. These are drivingly coupled to the outer ends (11) of the roller shell (1) and have a conical shape. This shape is made step-less on the left side, FIG. 2A, while on the right side (FIG. 2B) a step (24) is provided on the outside ring (9), which is engaged by the flange (2). This constitutes the so-called outside centering system. The individual ceramic rings (4) have blind holes (12) distributed over the circumference, into which pins or spring pins (14) in accordance with DIN 7346 are inserted so as to bind together and center the individual rings (4). In the annular space (22) between the roller shaft (3) and the shell (2) are indicated the elastic centering means (7), which can be in the form, for example, of spiral springs or they can be rubber-elastic blocks or rings. In the rubber-elastic ring represented on the right side of the roller this ring is a tube which is filled with a compressible medium such as air.

FIG. 3 shows a cross section through the cylinder according to the invention. In the upper part, FIG. 3A, the tie rods (6) are again disposed in the annular space (22) between the roller shell (1) and the roller shaft (3). In addition, the elastic centering means (7A) is here in the form of a sinuous annular spring. This spring can engage the recess (17) of the ring (4) as shown in FIG. 1B, but it can also be arranged so that it spans the abutments (5/5) between two rings (4).

In the bottom left and right part of FIG. 3B, FIG. 3C, the rings (4) of the roller shell (1) are provided with bores (8) distributed uniformly over the circumference, with hollow pins (23) inserted in them, through which tie rods (6) are passed. In the annular space (22) between roller shell (1) and roller shaft (3) the elastic centering means are represented in the left sector (FIG. 3b) as a rubber-elastic block 7B, and in the right sector (FIG. 3C) as a packet of plate springs 7C. These centering means (7B, 7C) are of course distributed uniformly around the entire circumference.

FIG. 4 shows still another embodiment of the roller according to the invention. Here the roller shaft (3) is fixedly mounted and has hydraulically or pneumatically operated, so-called "soft supporting piston units" (18), which are distributed over the circumference and the length and are preferably disposed at a point at which a line force acts from the outside on the roller shell (1). The supporting piston units (18) are provided at their ends in contact with the inner wall of the shell with skids (15) which are urged against the inside ground and polished surface of the roller shell. Between the skid (15) and the roller shell (1) is a supporting oil film. The roller shell (1) itself is rotatably mounted in self-aligning roller bearings (19) on the stationary roller shaft (3).

The individual rings (4) are bound together by hollow sleeves (23) disposed in bores (8) and are bound to the roller flanges (3) in a positively locking manner by tie rods (6) passing with clearance through the sleeves, with the application of tightening force.

We claim:

1. Roller for the pressure treatment of paper, cardboard and pulp webs in machines of the paper industry, comprising: a roller shell, roller flange and a roller shaft, at least one of the group consisting of elastic, axial and coaxial clamping means, and elastic or yielding centering means,
   a) the roller shell including individual rings of sintered ceramic disposed side by side,
   b) the at least one of the group consisting of elastic, axial and coaxial clamping means clamping the rings positively together under bias such that the roller shell transfers reliably to the roller shaft a line load applied to the roller shell,
   c) the elastic or yielding centering means aligning the rings concentrically on the roller shaft.

2. Roller according to claim 1, characterized in that the average roughness $R_a$ of the roller shell formed by the rings has a value between 0.01 and 1.0 μm and a roughness depth $R_t$ less than 1 μm.

3. Roller according to claim 1, characterized in that the rings have end faces and the end faces of the rings have an average roughness $R_a$ equal to or less than 0.5 μm and a flatness of less than 2 light bands.

4. Roller according to claim 1, characterized in that the rings have end faces and the deviation from parallelism of the end faces of the rings have an average roughness $R_a$ equal to or less than 0.01 μm per 1000 μm of measured length.

5. Roller according to claim 1, characterized in that the elastic clamping means is formed by at least one tie rod.

6. Roller according to claim 1, characterized in that the elastic axial clamping means is formed by the roller shaft.

7. Roller according to claim 1, characterized in that the roller includes flanges and the elastic clamping means is formed by a plurality of tension rods disposed coaxially with the roller shaft and coupled with the roller flanges.

8. Roller according to claim 1, characterized in that the elastic axial clamping means is formed by roller flanges in the form of plate springs.

9. Roller according to claim 1, characterized in that the elastic centering means is formed by radially disposed metal springs.

10. Roller according to claim 1, characterized in that the elastic centering means is formed from rubber-elastic materials.

11. Roller according to claim 1, characterized in that the elastic centering means is formed by at least one of the group consisting of radially disposed, pneumatically and hydraulically operated supporting units.

12. Roller according to claim 1, characterized in that the rings have a circumference and have at least three through-bores distributed over the circumference for the accommodation of tie rods.

13. Roller according to claim 1, characterized in that two outside rings of the roller shell have a step on outer end faces.

14. Roller according to claim 13, characterized in that the steps are conical.

15. Roller according to claim 13, characterized in that the outer end faces of the outside rings are truncoconically stepped.

16. Roller according to claim 1, characterized in that the rings have at least one of the group consisting of bores and blind holes in end faces for the accommodation of coupling means.

17. Roller according to claim 1, characterized in that tie rods are brought through coupling means with clearance.

18. Roller according to claim 1, characterized in that the rings consist of sintered oxide ceramic.

19. Roller according to claim 18, characterized in that the oxide ceramic consists of aluminum oxide with common sintering adjuvants, zirconium oxide, partially or fully stabilized zirconium oxide or aluminum oxide strengthened with zirconium oxide.

20. Roller according to claim 1, characterized in that the rings consist of nonoxidic, sintered ceramic.

21. Roller according to claim 20, characterized in that the nonoxidic ceramic consists of silicon carbide, silicon nitride, siliconized silicon carbide or sialon.

* * * * *